(No Model.) 6 Sheets—Sheet 2.
R. G. HOPKINS.
MACHINE FOR REELING, MEASURING, AND SEVERING TYPE WRITER
OR OTHER RIBBONS.
No. 524,088. Patented Aug. 7, 1894.

WITNESSES
INVENTOR
Robert G Hopkins (No Model.) 6 Sheets—Sheet 3.
R. G. HOPKINS.
MACHINE FOR REELING, MEASURING, AND SEVERING TYPE WRITER OR OTHER RIBBONS.
No. 524,088. Patented Aug. 7, 1894.
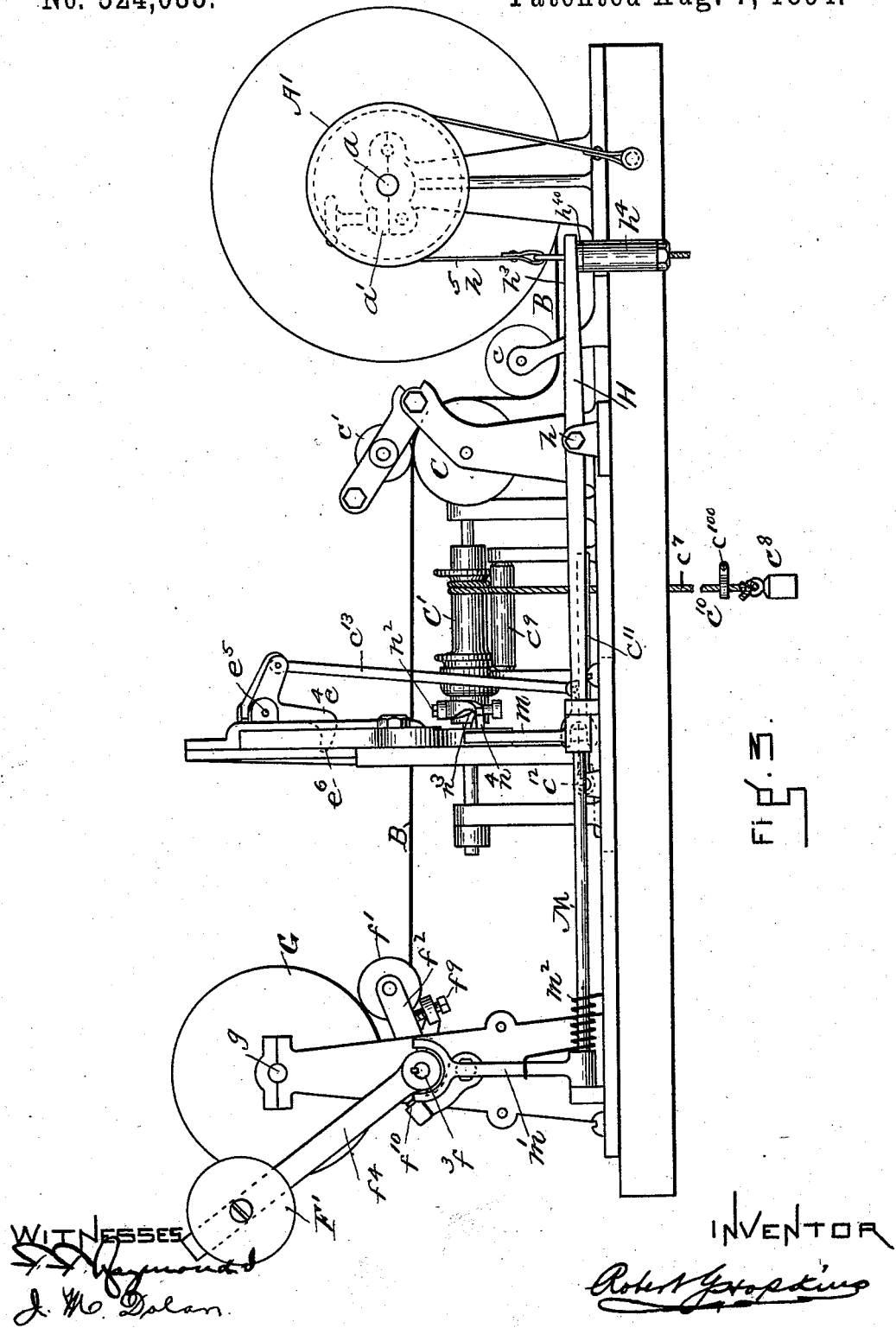
WITNESSES
INVENTOR (No Model.) 6 Sheets—Sheet 4.
R. G. HOPKINS.
MACHINE FOR REELING, MEASURING, AND SEVERING TYPE WRITER
OR OTHER RIBBONS.
No. 524,088. Patented Aug. 7, 1894.
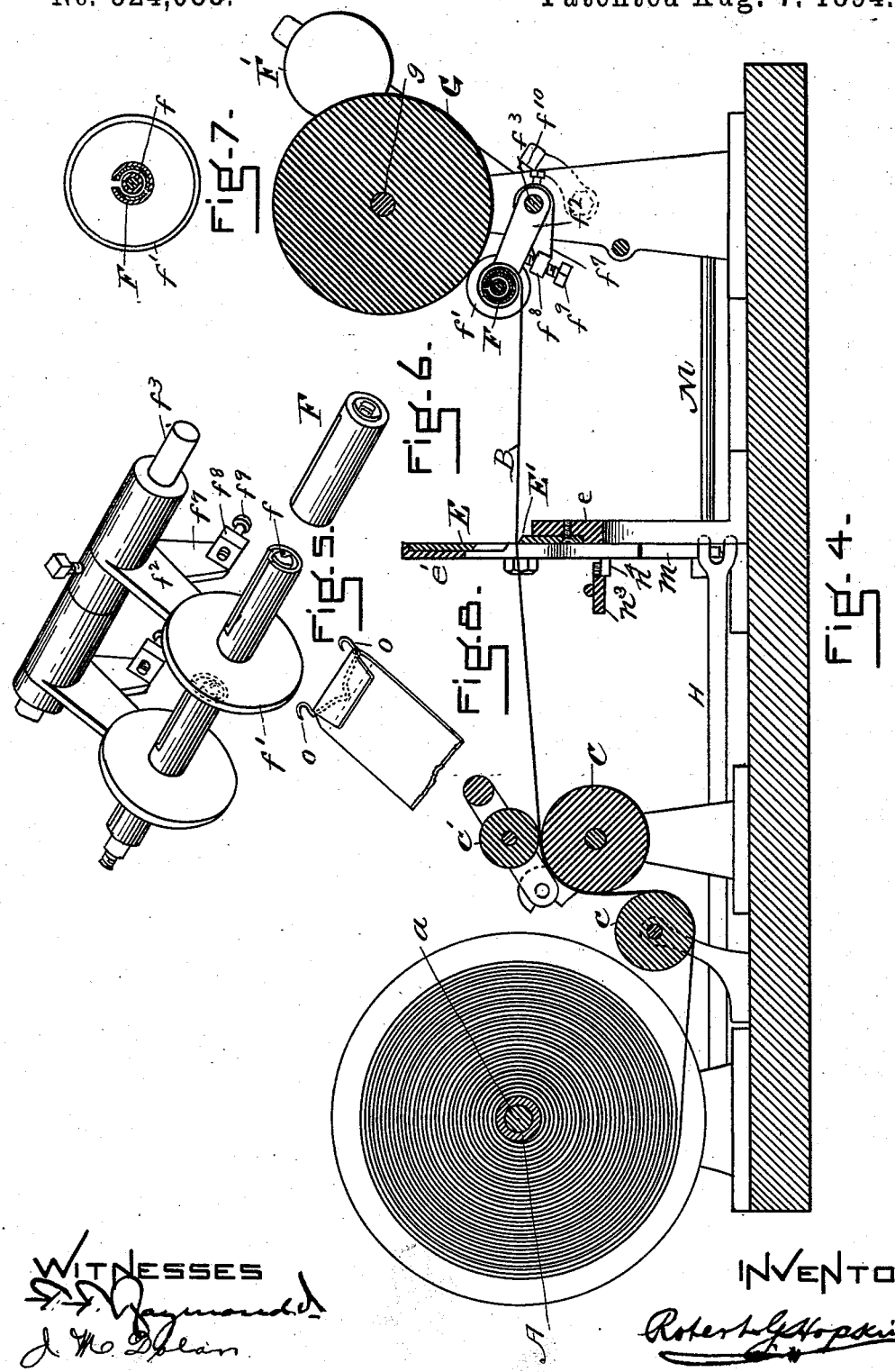

(No Model.) 6 Sheets—Sheet 5.

R. G. HOPKINS.
MACHINE FOR REELING, MEASURING, AND SEVERING TYPE WRITER OR OTHER RIBBONS.

No. 524,088. Patented Aug. 7, 1894.

WITNESSES

INVENTOR
Robert G. Hopkins (No Model.)                    6 Sheets—Sheet 6.
R. G. HOPKINS.
MACHINE FOR REELING, MEASURING, AND SEVERING TYPE WRITER OR OTHER RIBBONS.

No. 524,088.                    Patented Aug. 7, 1894.

WITNESSES                    INVENTOR
                              Robert G. Hopkins

UNITED STATES PATENT OFFICE.

ROBERT G. HOPKINS, OF SOMERVILLE, ASSIGNOR TO CARTER, DINSMORE & CO., OF BOSTON, MASSACHUSETTS.

MACHINE FOR REELING, MEASURING, AND SEVERING TYPE-WRITER OR OTHER RIBBONS.

SPECIFICATION forming part of Letters Patent No. 524,088, dated August 7, 1894.

Application filed September 28, 1893. Serial No. 486,678. (No model.)

*To all whom it may concern:*

Be it known that I, ROBERT G. HOPKINS, a citizen of the United States, residing at Somerville, in the county of Middlesex and State of Massachusetts, have invented a new and useful Improvement in Machines for Reeling, Measuring, and Severing Type-Writer or other Ribbons, of which the following is a full, clear, and exact description, reference being had to the accompanying drawings, forming a part of this specification, in explaining its nature.

The invention relates to a machine adapted to automatically wind upon one or more drums or barrels, preferably with which the ribbons are marketed, the ribbon of a marketable length from large ribbon holding drums or reels or other sources of supply; and to automatically stop the operation of the machine after a given quantity has been rolled upon the drums or barrels, and, if desired, to at the same time automatically sever the ribbon or ribbons thus wound; and the invention relates to various features of construction and organization whereby the ribbons are wound and the mechanism automatically stopped and the cutter, if one be used, automatically operated.

While I shall herein describe the invention as applicable to the reeling and measuring of inked ribbons for type-writing machines, I do not limit the invention to such use, as it is applicable to the winding and measuring of ribbons, strips, sheets, or webs of any flexible fabric or material.

Figure 1:
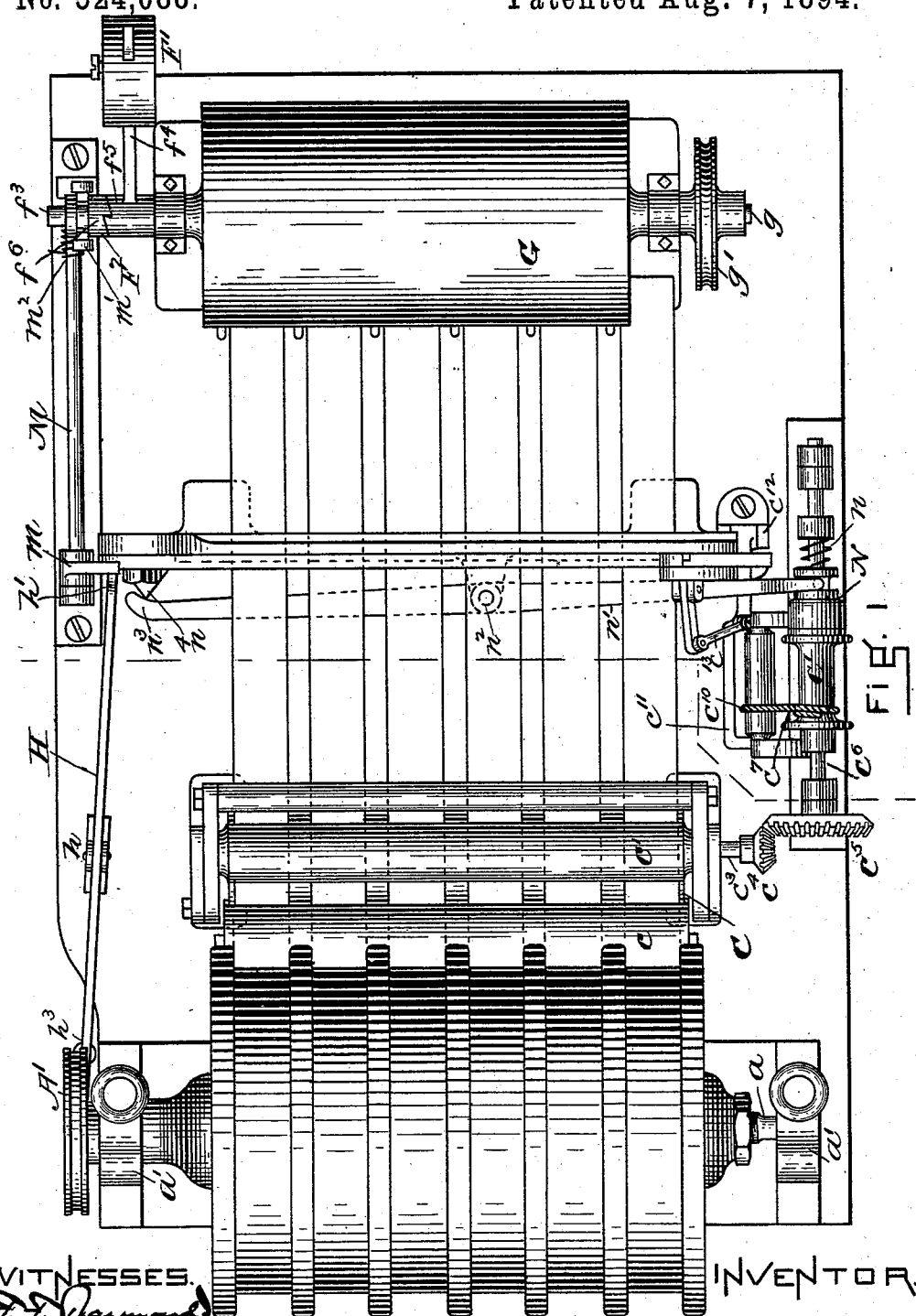
Figure 2:
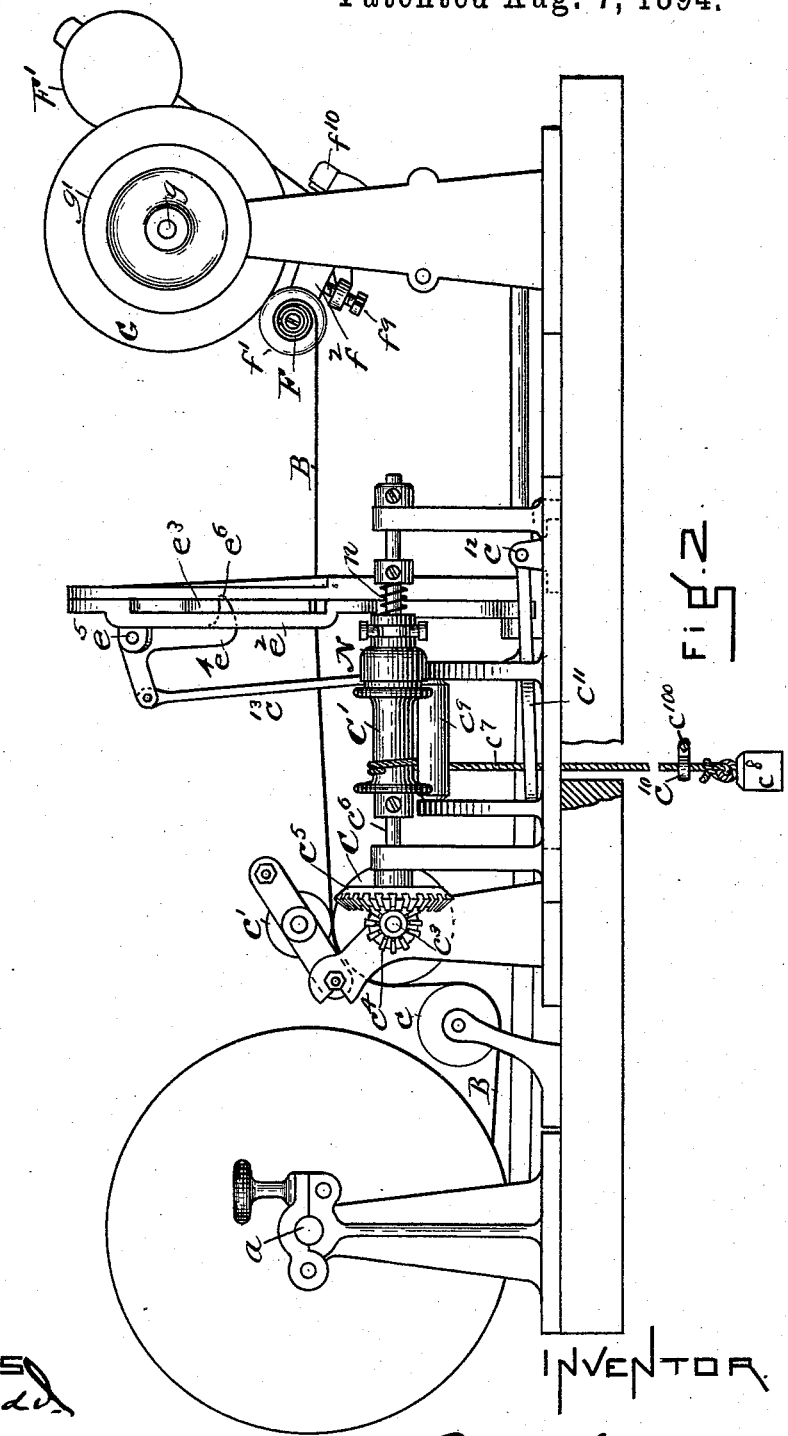
Figure 9:
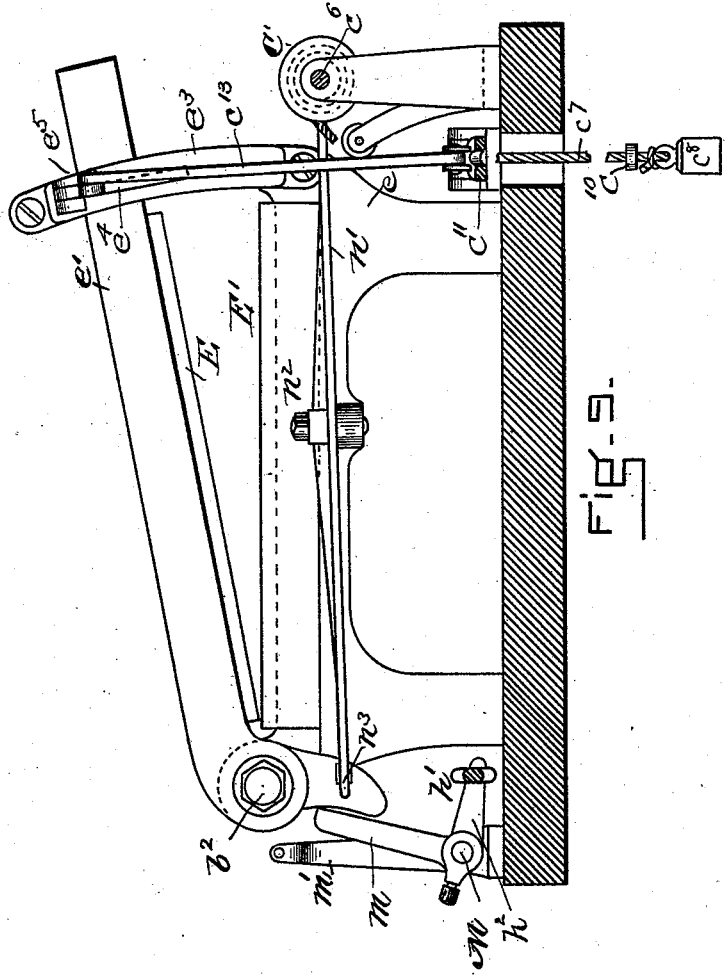
Figure 10:
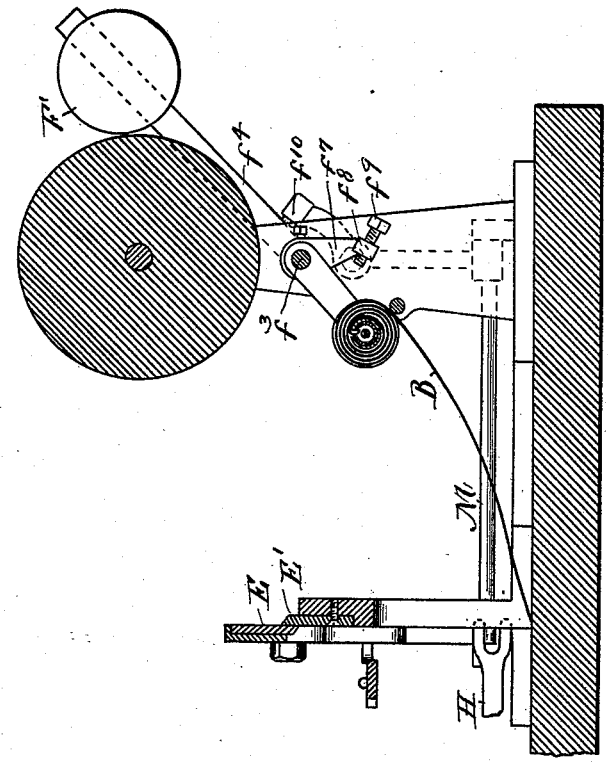

In the drawings,—Figure 1 is a view in plan of the machine. Fig. 2 is a view in side elevation thereof. Fig. 3 is a view also in side elevation of the side opposite that represented in Fig. 2. Fig. 4 is a view of the machine in vertical central section. Figs. 5, 6, 7, and 8 are detail views to which reference will hereinafter be made. Fig. 9 is a vertical section cross wise the machine on the dotted line of Fig. 1. Fig. 10 is a sectional view showing the disk away from the drum.

The machine is organized to reel, measure and sever one or more ribbons, and while in the drawings I have shown it as operating upon six ribbons, I will describe it as though operating upon one only.

The inked ribbon from the ribbon inking apparatus is received from such apparatus upon a drum or barrel A, which is mounted upon the stud or shaft $a$, upon which it is turned; the said shaft being supported at each end in bearings having removable hinged caps $a'$, which are adapted to be easily unfastened and to be thrown back upon their hinges to permit the shaft to be removed from the bearing for the placing of a filled drum or barrel and the removal of an empty one. This shaft has at one end a brake drum $A'$, to which attention will be hereinafter directed; the object of the brake drum and its brake being to automatically stop the rotation of the shaft and the drum and ribbon thereon when a receiving reel or drum has been fully wound and the machine automatically stopped.

The inked ribbon B takes the following course through the machine: Unwinding preferably from the lower edge of the roll, it passes under the tension-roll $c$, thence upward and over the measuring roll C between it and the tension roll $c'$, thence between the knives E E', (see Fig. 4) to the receiving drum or barrel F on the short stud or shaft $f$ (see Fig. 5) extending from one end of a disk $f'$ supported by the arm $f^2$ extending from the cross-rocker-shaft $f^3$. This drum or barrel is rotated by contact of the positively driven drum G with the edge of the disk $f'$ (see Figs. 2 and 3).

The drum G has a drum shaft $g$ which is suitably supported in boxes upon posts or brackets, and has at one end the pulley $g'$ over which a driving belt runs. The rocker-shaft $f^3$ is provided at one end with a sleeve from which extends an arm $f^4$ which carries a weight F' preferably adjustable upon it, said weight F' being an over-balancing weight which over-balances the weight of the shaft $f$, the drum thereon, the ribbon, and the disk $f'$ sufficiently to turn the shaft $f^3$ (when the clutch members presently described are in engagement) and hold the disk $f'$ in contact with the roll G through the medium of arm $f^7$ presently described while the machine is in operation. The weight arm $f^4$ is free to turn upon the shaft $f^3$ a limited distance except when connected with the shaft $f^3$ by the clutch $F^2$. This clutch comprises two members, one of which, the member $f^5$, is upon the outer end of the sleeve from which the arm $f^4$ extends. The other member $f^6$ is attached to the shaft $f^3$ by a fast feather, but is arranged to slide longitudinally thereon. The operation of this part of the device is as follows: When the two members of the clutch are engaged as represented in Fig. 1, the weight $F'$ then over-balances the disk $f'$ and its parts, and the disk is lifted against the drum $G'$ to the position represented in Fig. 4.

It will be understood that the arm $f^2$ is not secured to the shaft $f^3$, but is free to swing upon it, and that the lifting action is produced by means of another arm $f^7$ which is fast to the shaft $f^3$ and is moved by it; this arm preferably having at its outer end a lateral extension or nut $f^8$ and an adjusting screw $f^9$ which is adapted to be brought in contact with the under edge of the arm $f^2$ when the shaft $f^3$ has been turned by the weight $F'$; and this movement of the arm $f^7$ by the weight causes the arm $f^2$, disk $f'$, &c., to be lifted until the edge of the disk has been brought into contact with the drum G, and it also serves to hold the parts in this position until the weight $F'$ has been released by the disengagement of the member $f^6$ of the clutch from the member $f^5$, and when this takes place, the arm $f^4$ falls upon its stop or rest $f^{10}$ (see Fig. 3) and the weight $F'$ no longer exerts an over-balancing effect on the arm $f^7$; the disk $f'$ and its parts then being the over-balancing parts, fall away from the roll G, or to the position represented in Fig. 10, thereby immediately stopping the further rotation of the disk $f'$ and the winding of the ribbon upon the drum or barrel carried by it. This action of the clutch, weight, and disk takes place automatically and after the winding of the desired length of ribbon upon its barrel or drum, the result being reached, as above indicated, by the automatic disengagement of the member $f^6$ of the clutch from the member $f^5$.

The lower knife $E'$ is stationary, and is held by a suitable cross-support $e$. The upper knife E is movable, and is secured to a lever $e'$. This lever is preferably quite heavy, and is pivoted at its rear end $b^2$ to an upright, and its forward end slides in the guide-way $e^3$. (See Fig. 2). Its forward end is held in elevated position by the latch $e^4$ which is represented in the form of a hook pivoted at $e^5$ and having the end $e^6$ to close under the outer end of the pivoted bar. It is the downward movement of this bar that causes the automatic stopping of the machine and the severing of the measured ribbon. As above intimated, however, the knives may be dispensed with; but this would not interfere with the use of the knife-bar or lever in its capacity as a stopping device. The pivoted end of said knife bar or lever is connected with the brake of the drum A and with the clutch of the rocker-shaft $f^3$ and with the clutch of the winding roll hereinafter referred to, in such manner that upon its release by the latch and fall, it automatically sets the brake upon the drum $A'$, disengages the member $f^6$ of the clutch from the member $f^5$, and permits the disk $f'$ and the wound reel of ribbon to drop from the drum G and releases or withdraws the clutch from the winding roll to be described. Before specifying these various connecting devices, I will describe the mechanism which controls the operation of the latch $e^4$ and which includes the winding drum above referred to. The measuring roll C has a shaft $c^3$ supported in suitable bearings, and one end of which carries the bevel pinion $c^4$ which meshes the bevel pinion $c^5$ on the drum shaft $c^6$. The drum $C'$ has a chain cord $c^7$ attached to it which is wound upon the drum as the shaft $c^6$ is revolved.

The chain or cord has at its lower end a weight $c^8$ for putting tension upon it and for unwinding it from the drum, as will hereinafter be described, and the cord passes over a roller $c^9$ which serves to guide or lay it regularly upon the drum as it is wound.

The cord carries an adjustable tappet or finger $c^{10}$ which as it is wound comes into contact with a lever $c^{11}$ pivoted at $c^{12}$, (see Fig. 2) and connected with the latch $e^4$ by the long link $c^{13}$, and lifts it sufficiently to disengage the latch from the knife bar $e'$ and this releases the knife bar and permits it to drop. This tappet or finger $c^{10}$ may consist of a ring open at one side and having its ends connected by a bolt or screw $c^{100}$, (see Figs. 2 and 3) to clamp it in position on the cord.

The passing of the ribbon B over the measuring roll C of course causes it to be rotated, and this rotation is communicated to the drum $C'$, and the winding of the cord $c^7$ by the drum until the adjustable tappet is brought into play causes the lever $c^{11}$ to be moved and the bar $e'$ to be dropped at any pre-determined interval or when any desired length of ribbon has been rolled upon the barrel or roll F. To actuate the brake of the drum $A'$ by this movement of the lever $e'$, a lever H is pivoted at $h$ and its end $h'$ connected with a rock lever $h^2$ projecting from rock-shaft M. (See Fig. 9.) Its other end $h^3$ (see Fig. 3) bears against the stop or buffer $h^4$ on the end of the brake strap $h^5$, and upon the fall of the lever bar $e'$ the end $h'$ of the lever (through the parts $m$ and M presently described) is raised, and the end $h^3$ depressed, causing the brake strap $h^5$ to be drawn upon the brake drum $A'$, and exert a braking action upon it. The clutch member $f^6$ is disengaged from the clutch member $f^5$ of the rocker-shaft $f^3$ upon the fall of the lever bar $e'$, by means of the lever $m$ upon the end of the rock shaft M, this lever extending upward to a position to be moved outward by a projection upon the end of the lever bar $e'$ (see Fig. 9). This rock shaft M also carries a clutch lever $m'$ (see Fig. 3) the upper end of which is in the form of a yoke and has studs to enter a groove in the section $f^6$ of the clutch. A spring $m^2$ serves to move the section $f^6$ of the clutch toward the section $f^5$ and hold the lever $m$ in operative relation with the end of the lever bar $e'$. Upon the downward movement of the lever bar $e'$, the lever $m$ is moved outward, therefore turning the shaft M and causing the clutch lever $m'$ to also be moved outward and to move the member $f^6$ of the clutch from the member $f^5$.

To permit the cord $c^7$ to unwind after the operation of the latch $e^4$, as above specified, the drum $C'$ is fastened to the shaft $c^6$ by the friction clutch N, the drum being free to turn on the shaft $c^6$, and the clutch N being secured to it by a fast feather and bearing against one end of the drum. It is held in contact therewith by a spring $n$; it is removed from contact therewith by the lever $n'$ which is pivoted at $n^2$, and the end $n^3$ of which is in operative relation to the cam projection $n^4$ on the pivot end of the lever bar $e'$, so that upon the release of the lever bar $e'$, the projection $n^4$ coming in contact with the end $n^3$ of the lever causes it to remove the clutch M from the barrel $C'$, and the weight then causes the cord to be unwound.

To restore the clutch N, release the brake from the drum A and permit the engagement of the members $f^5 f^6$ of the clutch, the lever bar $e'$ is lifted by hand until it is automatically engaged by the latch $e^4$. The arm $f^4$ is then lifted sufficiently to permit the engagement of the sections $f^5 f^6$ of the clutch and their release permits the weight $F'$ to lift the disk $f'$ and the barrel F, and this of course causes the operation of the machine.

To receive a form of drum or barrel which I prefer in some instances to employ, I have provided the stud $f$ with a surrounding barrel which is slitted and which is of a size to receive the removable slitted barrel F. The barrel F is placed upon the permanent barrel with the slits in line and the ribbon having the hooks $o$ attached to its end preferably by an uninked section is engaged with the removable barrel by entering the hooks in the slit.

In use, a roll of inked ribbon is placed upon the shaft $a$ and its end carried about the roll $c$ over the measuring roll C, beneath the lever $e'$ to the drum F, and the machine is then put in operation as above indicated, the ribbon reeled, and measured, and the machine automatically stopped.

The buffer $h^4$, Fig. 3, preferably is made of rubber, although it may be in the form of a metal spring. There is a washer $h^{40}$ between it and the end of the lever H. The office of the buffer is to relieve the lever H and the brake strap $h^5$ from undue strain. Obviously the weight $c^8$ may be dispensed with if the adjustable tappet $c^{10}$ be made sufficiently heavy to act as a weight as well as tappet.

Having thus fully described my invention, I claim and desire to secure by Letters Patent of the United States—

1. In a machine of the character specified, the combination of a delivery reel or drum, a shaft having a friction disk, a winding barrel or drum mounted upon said shaft, a driving drum to engage said friction disk, a measuring roll over which ribbon may be drawn, means for automatically severing the ribbon at pre-determined intervals, and an automatic releasing device connected to and operated by the severing means for disengaging the winding drum and friction disk from the driving drum, substantially as and for the purposes described.

2. The combination of a delivery reel or drum, a winding drum or barrel, a brake to operate upon the delivery drum, a stop or buffer connected to the brake, an arm or lever adapted to operate upon said stop or buffer to set the brake, a bar and means for holding it in an elevated position, means for automatically releasing said bar at predetermined intervals and connections between said bar and said arm or lever.

3. In a machine of the character specified, the combination of the delivery drum, a shaft, a winding barrel or drum mounted upon said shaft, said shaft having a friction disk, a drum to engage said disk, a pivoted arm for holding said disk in engagement with the drum and having a clutch member connected therewith, a second clutch member co-operating with the first member and having a weighted arm, and means for automatically disengaging the clutch members at pre-determined intervals.

4. In a machine of the character specified, the combination of the delivering drum or reel, a receiving drum or barrel, means for rotating the latter, a measuring roll, a shaft geared to the latter, a drum $C'$ loosely mounted on said shaft and having a weighted chain or cord $c^7$ wound thereon, a clutch connecting the said drum with its shaft, means for releasing the clutch at a predetermined time and mechanism operated by the winding of the cord or chain for stopping the operation of the machine, substantially as and for the purpose set forth.

5. In a machine of the character specified, the combination of the shaft $f$, the friction disk $f'$ and the pivoted arm $f^2$, carrying said shaft and disk with the shaft $f^3$, the arm $f^7$ to engage and hold the arm $f^2$ as specified, the weighted arm $f^4$ loosely mounted upon said shaft $f^3$, and the clutch $F^2$ connecting the arm $f^4$ and shaft $f^3$, all operated as and for the purposes described.

6. In a machine of the character specified, the combination of the delivery drum A and a brake therefor, the measuring roll C, a shaft $c^6$ geared to the latter, a drum C' loosely mounted on said shaft and connected therewith by a clutch, the lever $e'$, a latch for holding it in an elevated position, means connected with the said drum C' for releasing the latch, and means whereby, upon the release of the latch, the fall of the lever will set the brake and release the clutch, substantially as described.

ROBERT G. HOPKINS.

In presence of—
    F. F. RAYMOND, 2d,
    J. M. DOLAN.